Patented Feb. 17, 1942

2,273,467

UNITED STATES PATENT OFFICE 2,273,467

ETHYLATED DI-ISOPROPYL HALOBENZENE

Robert R. Dreisbach, Midland, Mich., assignor to
The Dow Chemical Company, Midland, Mich.,
a corporation of Michigan No Drawing. Application October 3, 1938,
Serial No. 233,035

7 Claims. (Cl. 260—650)

This application is a continuation-in-part of my co-pending application, Serial No. 91,428, filed July 18, 1936, now U. S. Patent No. 2,149,762, which claims a series of new organic products consisting of nuclear ethylated di-isopropyl benzenes and mixtures of their isomers. The present invention concerns another series of new products, viz., the nuclear halogenated derivatives of said ethylated di-isopropyl benzenes.

The new compounds encompassed by the invention have the general formula

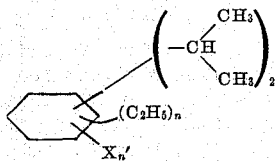

wherein X is chlorine or bromine and $n$ and $n'$ are integers having a sum not exceeding 4. They are hereinafter referred to generically as "ethylated di-isopropyl halobenzenes." The products are, in most instances, liquid mixtures of isomeric compounds having the above formula, although individual compounds may in some instances be obtained. All of the products are useful as organic solvents and as dielectric agents.

The products may be prepared by reacting halogenated benzene, containing not more than 3 halogen, i. e. chlorine or bromine, atoms per molecule successively with ethylene and propylene in the presence of a Friedel-Crafts catalyst, or by similar procedure using an ethyl halide, e. g. ethyl bromide or chloride, and an isopropyl halide as the alkylating agents. They may also be prepared by the nuclear chlorination or bromination of an ethylated di-isopropyl benzene. The latter method is preferred since the halogenation occurs smoothly, whereas the presence of halogen in the nucleus of ethylated benzene renders isopropylation difficult.

The thylated di-isopropyl benzene to be halogenated in accordance with the preferred method is prepared by successively ethylating and isopropylating benzene in the presence of a Friedel-Crafts catalyst using ethylene or an ethyl halide and propylene or an isopropyl halide as the respective alkylating agents. These reactions are preferably carried out by passing ethylene under a moderately elevated pressure, e. g. up to 100 pounds per square inch, and with stirring into a solution of between 0.05 and 0.1 molecular equivalent of aluminum chloride in benzene until sufficient ethylene has been absorbed to ethylate the benzene to a stage containing from 1 to 3 ethyl groups per molecule. The introduction of ethylene is then discontinued and propylene is added under the reaction conditions just described until approximately 2 moles of propylene have been reacted per mole of the benzene initially employed. The introduction of propylene is then stopped and the mixture is permitted to stand, whereupon a heavy sludge layer, containing the catalyst, settles and is drawn off for re-employment in successive reactions. The clear super-natant layer containing the ethylated di-isopropyl benzene is neutralized with aqueous alkali, washed with water, dried, and fractionally distilled to separate the ethylated di-isopropyl benzene. The latter is a liquid mixture of isomeric and/or homologous ethylated di-isopropyl benzene compounds. It contains an average of 2 isopropyl radicals and from 1 to 3 ethyl groups per molecule.

Ethylated di-isopropyl benzene, suitable for use in preparing the ethylated di-isopropyl halobenzene products of the present invention, may also be prepared by di-isopropylating monoethyl benzene, diethyl benzene, or triethyl benzene from any source in accordance with the general procedure described above. The ethylated di-isopropyl benzene so produced is also a mixture of isomeric and/or homologous compounds, although usually not as complex a mixture as is obtained by the consecutive ethylation and isopropylation of benzene.

The ethylated di-isopropyl benzene is then chlorinated and/or brominated in its nucleus by reaction with chlorine or bromine at moderate temperatures, e. g. at temperatures not exceeding 50° C., in the presence of iron, iron chloride, iron bromide, or other catalyst effective in promoting the nuclear halogenation of aromatic compounds. After completing the halogenation, the mixture is neutralized with alkali, washed with water and distilled. The product is a clear liquid useful both as an organic solvent and as a dielectric agent. When it is to be used as a dielectric agent, however, it preferably is either heated alone to a high temperature, e. g. 150°–250° C., or at a moderately elevated temperature, e. g. 80°–150° C., with an alkali such as sodium hydroxide, potassium hydroxide, sodium carbonate or lime, etc., prior to the distillation. Such heating operation removes any reactive halogen atoms in the product thereby stabilizing the latter against deterioration during use in electric equipment and improving its dielectric properties.

Example 1

A mixture of 6780 grams of diethyl benzene and 454 grams of aluminum chloride was treated at about 20° C. with propylene until 3902 grams of propylene was absorbed. The mixture was then permitted to settle and the sludge layer was drawn off. The supernatent layer was washed with water, neutralized, dried, and fractionally distilled, whereby 1300 grams of diethyl di-isopropyl benzene was obtained. The diethyl di-isopropyl benzene was a mixture of isomers. It had the following properties:— boiling range, 250°–255° C. at 750 millimeters pressure; viscosity at 60° F., 95.1 millipoises; index of refraction, 1.4968 at 25° C.; specific gravity, 0.875 at 60° C.; per cent by weight of hydrogen, 11.8; per cent of carbon, 88.2. A mixture of 302 grams of this diethyl di-isopropyl benzene, 100 grams of glacial acetic acid, 50 grams of sodium acetate, and 15 grams of iron filings was stirred and maintained at 40° C. while 198.5 grams of chlorine was gradually passed thereinto. The mixture was then washed with water, dried, and fractionally distilled. There was separated a fraction boiling at approximately 284° C. under 741 millimeters pressure and having an index of refraction of 1.5196 at 25° C. and a specific gravity of 0.985 at 25° C. with respect to water at the same temperature. It was a permanent liquid at room temperature and possessed a high electric resistivity and a high breakdown potential as well as other good dielectric properties which rendered it suitable for use as a liquid dielectric agent. On analysis this fraction was found to be a mixture of isomeric diethyl di-isopropyl monochlorobenzenes.

Example 2

A mixture of 227 grams of diethyl di-isopropyl benzene, which was prepared as in Example 1, 150 grams of glacial acetic acid, 50 grams of sodium acetate and 10 grams of iron filings was stirred and maintained at temperatures between 40° and 45° C. while 92 grams of bromine was gradually added thereto. The mixture was then washed and fractionally distilled whereby a fraction was separated which boiled at about 296° C. under 742 millimeters pressure, had an index of refraction of 1.5324 at 25° C., and a specific gravity of 1.143 at 25° C. with respect to water at the same temperature and analyzed correctly as diethyl di-isopropyl benzene. It was a liquid at room temperature and was probably a mixture of isomeric diethyl di-isopropyl bromobenzenes.

Example 3

A mixture of 393 grams of the diethyl di-isopropyl benzene, prepared as in Example 1, 200 grams of glacial acetic acid, 50 grams of sodium acetate, and 10 grams of iron filings was treated with 217 grams of bromine at temperatures between 40° and 50° C., the bromine being added to the mixture gradually and with stirring. After all of the bromine had been added the mixture was washed with water and fractionally distilled, whereby a fraction was separated which boiled at 321° C. under 745 millimeters pressure, had an index of refraction of 1.5597 at 25° C., and a specific gravity of 1.386 at 25° C. with respect to water at the same temperature and analyzed correctly as diethyl di-isopropyl dibromobenzene. It was a liquid mixture of isomeric diethyl di-isopropyl dibromobenzenes.

Example 4

A mixture of isomeric monoethyl di-isopropyl monochlorobenzenes was prepared by reacting propylene with ethyl benzene to form di-isopropyl ethyl benzene and then chlorinating the latter. The procedure in carrying out these reactions and in separating the product was similar to that described in Example 1. The monoethyl di-isopropyl chlorobenzene mixture was a clear colorless liquid having a boiling point of about 260–261° C. at 752 millimeters pressure, a specific gravity at 37.8° C. of 0.964 with respect to water at the same temperature, an index of refraction of $n25/D = 1.5080$, and a viscosity at 37.8° C. of 35.16 Saybolt seconds. It analyzed correctly as monoethyl di-isopropyl monochlorobenzene.

Example 5

Ethyl di-isopropyl dichlorobenzene was prepared by successively reacting ethylene and propylene with ortho-di-chlorobenzene as in Example 1. The product, which was a mixture of isomers, was purified by distillation. It was a colorless liquid having a boiling point of about 291–292° C. at 744 millimeters pressure, a specific gravity of 1.081 at 25° C. with respect to water at the same temperature, an index of refraction of $n25/D = 1.5264$, and a viscosity at 37.8° C. of 112.6 Saybolt seconds. It analyzed correctly as mono-ethyl di-isopropyl dichlorobenzene.

Example 6

A mixture of isomeric triethyl di-isopropyl monobromobenzenes was prepared by reacting benzene successively with ethylene, propylene, and bromine and purifying the product by distillation, the procedure being similar to that described in Example 1. The product was a clear colorless liquid boiling at approximately 135–140° C. at 7 millimeters pressure and having a specific gravity of 1.148 at 25° C. with respect to water at the same temperature. Its bromine content corresponded closely to theoretical for the compound triethyl di-isopropyl monobromobenzene.

Other ethylated di-isopropyl halobenzene products may be prepared by the methods hereinbefore described. Examples of such other ethylated di-isopropyl halobenzenes are monoethyl di-isopropyl monobromobenzene, monoethyl di-isopropyl dibromobenzene, monoethyl di-isopropyl trichlorobenzene, triethyl di-isopropyl monochlorobenzene, and the corresponding brominated benzene derivatives. All such products possess good electric insulating properties and are useful as dielectric agents.

Other modes of applying the principle of the invention may be employed instead of those explained, change being made as regards the products herein disclosed, provided the compounds stated by any of the following claims or the equivalent of such stated compounds be employed.

I therefore particularly point out and distinctly claim as my invention:

1. A compound having the general formula,

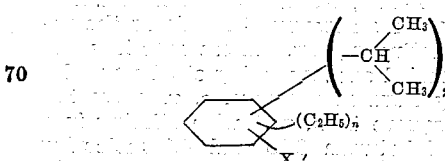

wherein X is a halogen selected from the class consisting of chlorine and bromine and $n$ and $n'$ are integers having a sum not exceeding 4.

2. A mixture of isomeric compounds having the formula,

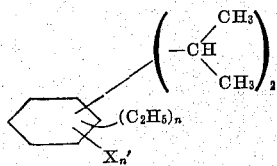

wherein X is a halogen selected from the class consisting of chlorine and bromine and $n$ and $n'$ are integers having a sum not exceeding 4.

3. A mixture of isomeric compounds having the general formula,

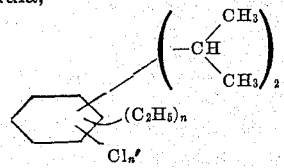

wherein $n$ and $n'$ are integers having a sum not exceeding 4.

4. A mixture of isomeric compounds having the general formula,

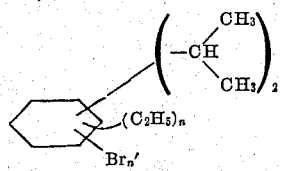

wherein $n$ and $n'$ are integers having a sum not exceeding 4.

5. A liquid mixture of isomeric diethyl di-isopropyl monochloro benzenes.

6. A liquid mixture of isomeric diethyl di-isopropyl monobromo benzenes.

7. A liquid mixture of diethyl di-isopropyl dibromo benzenes.

ROBERT R. DREISBACH.